US007674162B1

(12) United States Patent  (10) Patent No.: US 7,674,162 B1
Gasbarro  (45) Date of Patent: Mar. 9, 2010

(54) CHICKEN MID-WING SPLITTER

(75) Inventor: Geno N. Gasbarro, Columbus, OH (US)

(73) Assignee: Remington Holdings, LLC, Columbus, OH (US)

( * ) Notice: Subject to any disclaimer, the term of this patent is extended or adjusted under 35 U.S.C. 154(b) by 0 days.

(21) Appl. No.: 12/469,130

(22) Filed: May 20, 2009

(51) Int. Cl.
    *A22C 21/00* (2006.01)
(52) U.S. Cl. .................................................... 452/160
(58) Field of Classification Search ......... 452/149–152, 452/155, 156, 160–162
    See application file for complete search history.

(56) References Cited

U.S. PATENT DOCUMENTS

| 4,472,858 | A | * | 9/1984 | Keith ............................. 452/3 |
| 4,769,872 | A | * | 9/1988 | Hazenbroek et al. ........ 452/169 |
| 5,462,478 | A | * | 10/1995 | Fredsby et al. .............. 452/135 |
| 6,120,369 | A | * | 9/2000 | Eide ........................... 452/149 |
| 6,656,032 | B2 | * | 12/2003 | Hazenbroek et al. ........ 452/125 |
| 7,056,202 | B2 | * | 6/2006 | Pein ............................. 452/161 |
| 7,204,748 | B2 | * | 4/2007 | Gasbarro ..................... 452/149 |
| 7,374,478 | B2 | * | 5/2008 | Gasbarro ..................... 452/149 |

* cited by examiner

*Primary Examiner*—Thomas Price
(74) *Attorney, Agent, or Firm*—Jason H. Foster; Kremblas, Foster, Phillips & Pollick

(57) ABSTRACT

An apparatus for spitting whole poultry mid-wing sections into a first radius portion that includes the radius bone of the mid-wing and its surrounding muscle, tissue, and skin and a second ulna portion that includes the ulna bone of the mid-wing and its surrounding muscle, tissue, and skin. The apparatus is provided with a rotatably driven carrier wheel having a plurality of product carrier slots formed therein for accepting mid-wings and moving them along a predetermined arcuate path. A splitting blade is mounted in the arcuate path for engaging and splitting the mid-wings into the desired portions. The apparatus is additionally provided with a retention fender for preventing mid-wings from exiting the carrier slots while the mid-wings are being split, and an ejector comb for forcing the mid-wings out of the carrier slots after they have been split.

9 Claims, 6 Drawing Sheets

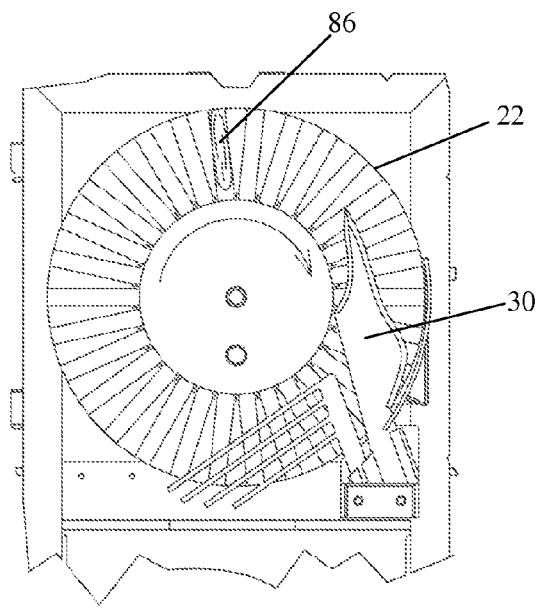
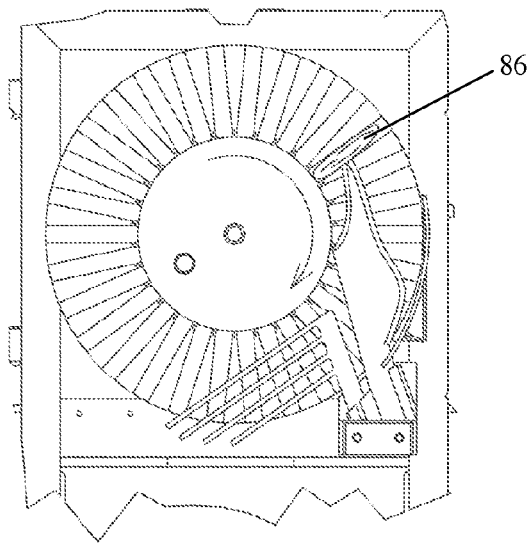
Fig. 6
Fig. 7
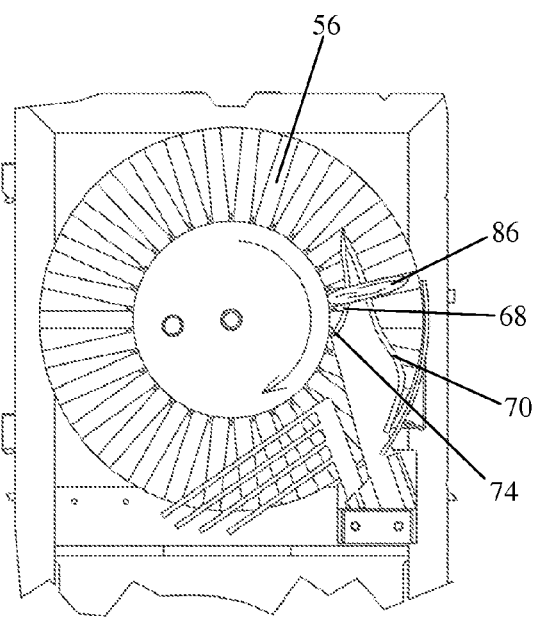
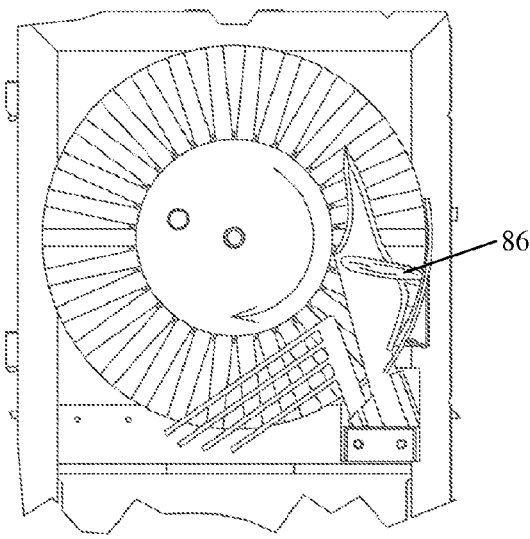
Fig. 8
Fig. 9

CHICKEN MID-WING SPLITTER

BACKGROUND OF THE INVENTION

1. Field of the Invention

This invention relates generally to a poultry processing apparatus and more particularly to an apparatus for automatically separating the radius and ulna portions of a poultry mid-wing from one another.

2. Description of the Related Art

To meet the demands of large scale poultry consumption throughout the world, numerous machines have been developed over the past several decades to enhance various aspects of poultry processing with particular attention directed toward improving the efficiency with which various cuts of poultry meat can be produced. While such machines have proven to be highly effective for producing various different cuts of poultry, some poultry parts contain small, tightly spaced bones that require complex manual manipulation to be separated into smaller cuts. For example, the mid-wing section of a poultry wing, which is located intermediate the larger, more muscular drumette section and the smaller, less muscular wingtip section, contains two generally parallel bones (i.e., the radius and the ulna bones) that are joined together at their ends by ligaments.

Although mid-wing sections of poultry wings are typically cooked and consumed as unitary pieces of food in the United States, it is common practice in some parts of the world to separate the radius bone and its surrounding muscle, tissue, and skin (herein referred to as the "radius portion") from the ulna bone and its surrounding muscle, tissue, and skin (herein referred to as the "ulna portion") to produce two separate, smaller cuts of meat. These cuts are generally easier to consume than a whole mid-wing in that they do not require a consumer to manually rend, or eat between, the radius and ulna bones. This method of preparing mid-wing sections of poultry has been gaining popularity in light of recent advances in agronomy that have allowed the farming of larger, more muscular poultry. Such poultry have large mid-wing sections that can be difficult to manually rend or otherwise consume as a single piece.

Traditionally, the radius and ulna portions of poultry mid-wing sections have been separated by manual cutting, which is time consuming, labor intensive, and somewhat dangerous. The inconsistent nature of manual cutting can also result in the accidental cutting or nicking of the radius and ulna bones themselves, which can create shards of bone that make the cuts undesirable. Therefore, the need exists for a means of separating the radius and ulna portions of poultry mid-wing sections safely, efficiently, and without forming shards.

BRIEF SUMMARY OF THE INVENTION

In accordance with the present invention, there is provided a poultry mid-wing splitting apparatus having a rotatably driven carrier wheel mounted on a support frame. The carrier wheel is preferably formed of two substantially identical wheel-halves that can be axially separated from one another to facilitate convenient maintenance or repair of the apparatus. A plurality of radially-oriented product carrier slots are formed in the wheel for accepting poultry mid-wings. The carrier wheel is also provided with a radially-elongated annular channel that extends from a central hub of the wheel to the periphery of the wheel. The annular channel intersects, and preferably bisects, each of the product carrier slots.

A substantially planar splitting blade is removably mounted within the annular channel for engaging mid-wings as they are rotatably moved by the carrier wheel along an arcuate path in a downstream direction (i.e., away from the mid-wings' point of entry into the product carrier slots and toward the splitting blade). As the mid-wings are forced over the splitting blade by the carrier wheel, the splitting blade longitudinally splits the mid-wings into separate radius and ulna portions. A retention fender having a radially inwardly-facing arcuate surface is preferably mounted in close proximity to the outer periphery of the carrier wheel for preventing mid-wings from being ejected from the product carrier slots as they are being split.

A substantially planar ejector comb is removably mounted within the annular channel downstream of the splitting blade. The ejector comb has a plurality of parallel tines extending therefrom in a generally downstream and radially outward direction. As the separated radius and ulna portions of the mid-wings are moved by the carrier wheel over the tines, frictional engagement between the mid-wings and the tines causes the mid-wings to be forced radially outwardly and ultimately ejected from the product carrier slots. Preferably, the separated radius and ulna portions thereafter fall by gravity into a product collection bin below the carrier wheel.

Therefore, it is an aspect of the present invention to provide an apparatus for separating the radius and ulna portions of a poultry mid-wing from one another.

BRIEF DESCRIPTION OF THE SEVERAL VIEWS OF THE DRAWINGS

FIGS. 6-13 are a series of partial front views illustrating the preferred embodiment of the present invention shown in FIG. 1, with a poultry mid-wing in a carrier slot being rotatably advanced by the carrier wheel.

Figure 1:
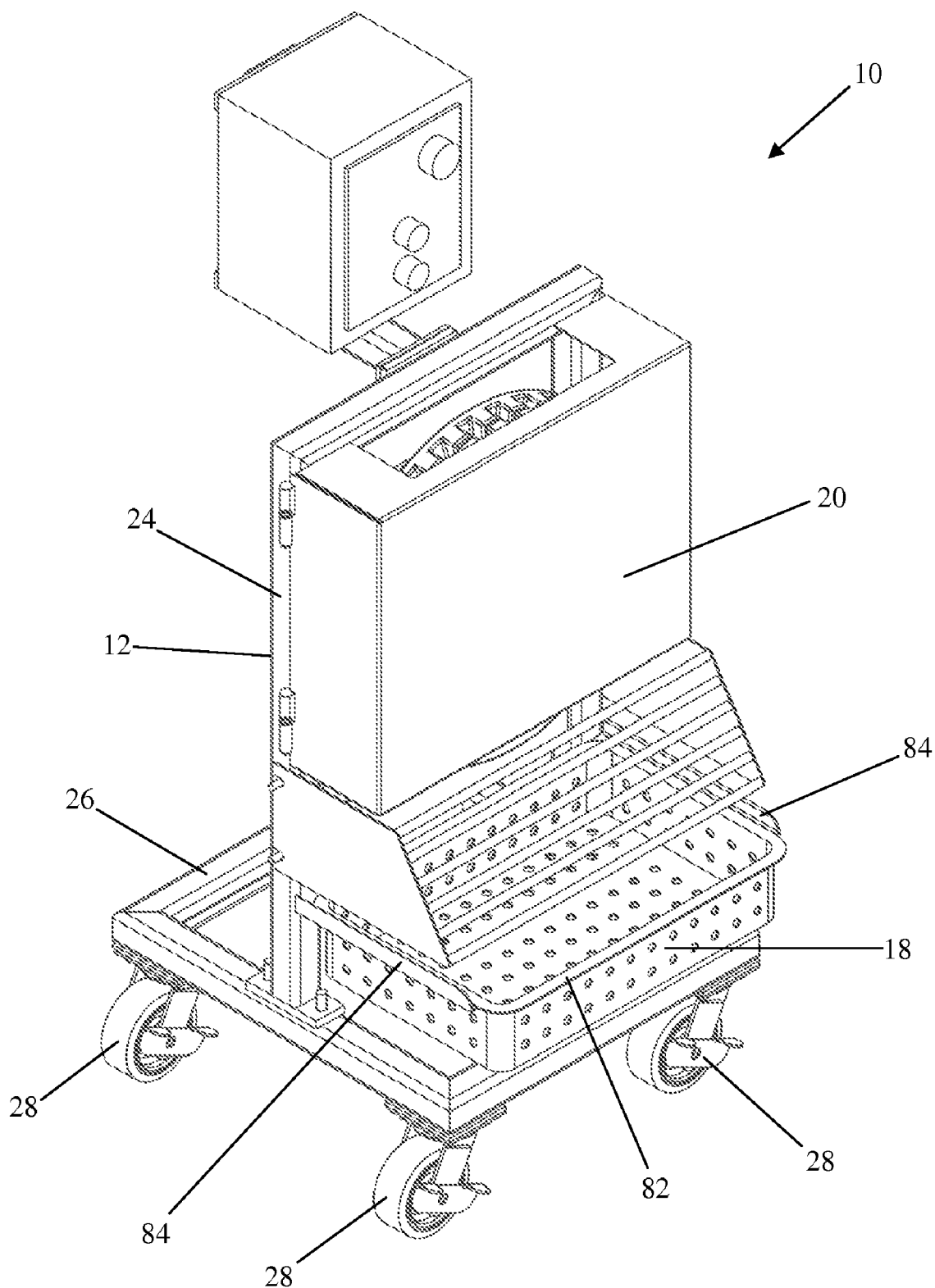
FIG. 1 is a perspective view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
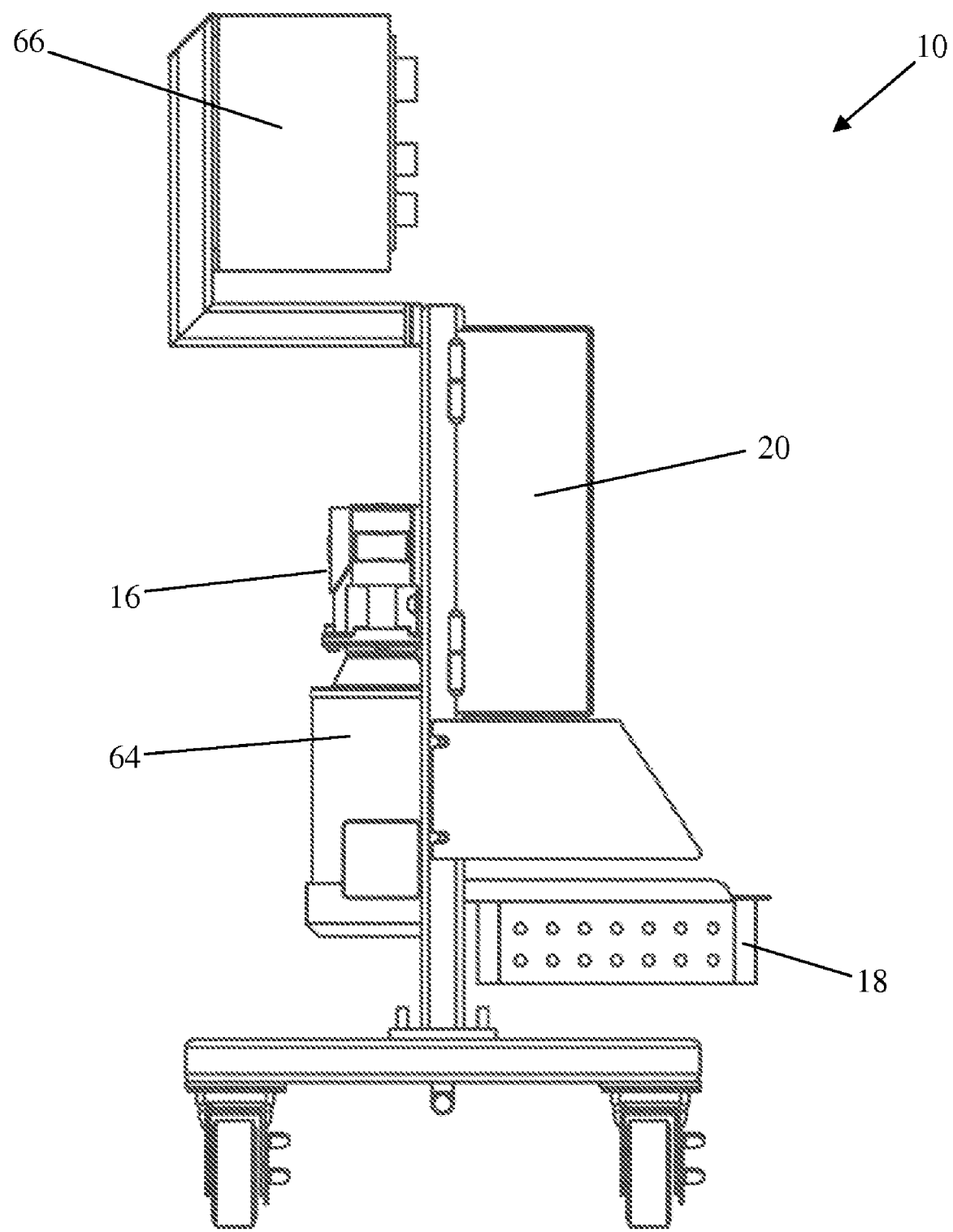
FIG. 2 is a left side view illustrating the preferred embodiment of the present invention shown in FIG. 1.
Figure 3:
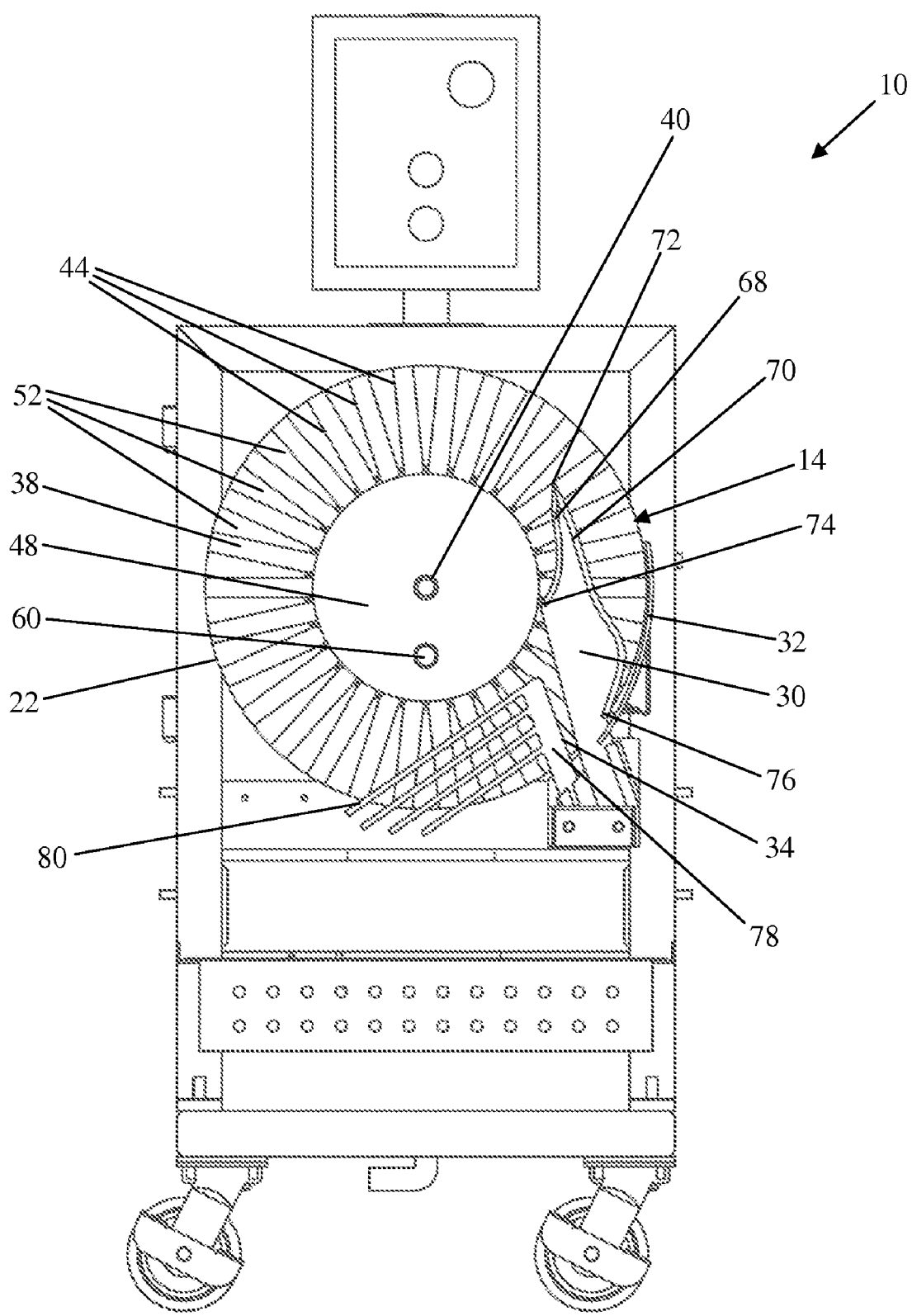
FIG. 3 is a front view illustrating the preferred embodiment of the present invention shown in FIG. 1 with the safety cover and front wheel-half removed for clarity.

An apparatus for splitting the mid-wing sections of poultry wings into separate radius and ulna portions is indicated generally at 10 in FIGS. 1-3 and is constructed in accordance with the present invention. The apparatus 10 generally includes a support frame 12, a splitting station 14, a drive system 16, and a collection bin 18. The apparatus 10 preferably also includes a lockable safety cover 20 (see FIGS. 1 and 2) that is hingedly mounted to the support frame 12 for preventing an operator from coming into contact with the moving parts of the apparatus 10 during operation of the apparatus and for allowing access to the splitting station 14 when necessary. For the sake of clarity, the safety cover 20 is removed in FIGS. 3 and 6-13.

Terms such as "front," "rear," "top," "bottom," "up," "down," "inwardly," "outwardly," "horizontal," "vertical," "lateral," and "longitudinal," will be used herein to describe the relative placement and orientation of various components of the apparatus 10, all with respect to the geometry and orientation of the apparatus 10 as it appears in FIG. 1. The terms "upstream" and "downstream" will be used herein to refer to a relative counter-clockwise position and a relative clockwise position, respectively, both with reference to the carrier wheel 22 (described in detail below) as it is oriented in FIG. 1. The terms "radial" and "axial" are used to indicate directions relative to the carrier wheel 22. The above terminology will include the words specifically mentioned, derivatives thereof, and words of similar import.

Referring to FIG. 1, the support frame 12 includes numerous horizontal and vertical frame members, such as steel tubing sections 24 and 26, that are rigidly joined together to provide suitable support for the other components of the apparatus 10. The support frame 12 is preferably provided with locking casters 28 for allowing the apparatus 10 to be easily moved and secured at a desired location within a plant or other operating environment.

Figure 4:
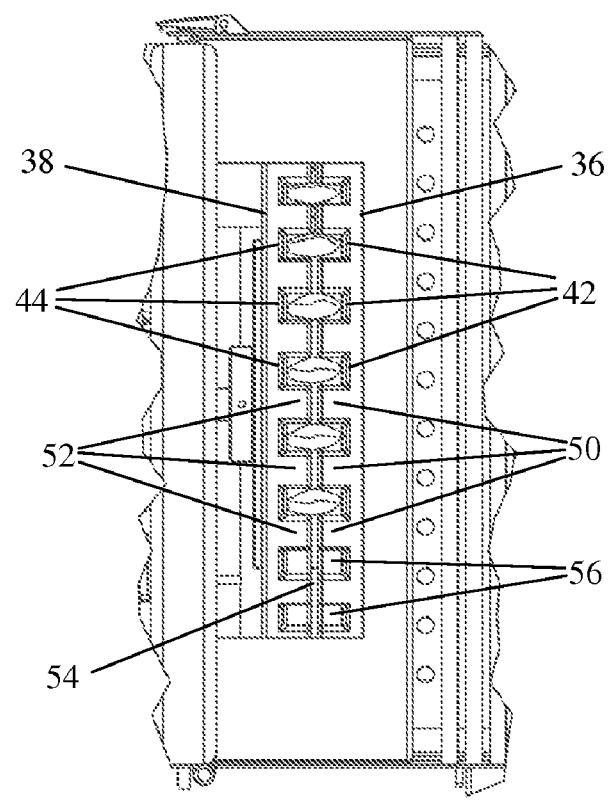
FIG. 4 is a partial top view illustrating the carrier wheel of the preferred embodiment of the present invention shown in FIG. 1.

Referring now to FIG. 3, the splitting station 14 includes a carrier wheel 22, a splitting blade 30, a retention fender 32, and an ejector comb 34. The carrier wheel 22 is formed of substantially identical, laterally-opposing front and rear wheel-halves 36 and 38 (the front wheel-half 36 is shown in FIG. 4) that are mounted in an abutting relationship on a horizontal drive shaft 40 that extends through the axis of each wheel-half 36 and 38. Each wheel-half 36 and 38 is provided with a plurality of rectangular grooves 42 and 44, respectively (the rectangular grooves 42 of the front wheel-half 36 are shown in FIG. 4), formed in its axially inwardly facing surface. The grooves 42 and 44 extend radially outwardly from a central hub 48 (the central hub of the front wheel-half 36 is not within view) to the periphery of each wheel-half 36 and 38, respectively.

The grooves 42 and 44 of each wheel-half 36 and 38 are defined by a plurality of spaced triangular ribs 50 and 52, respectively (the triangular ribs 50 of the front wheel-half 36 are shown in FIG. 4). The grooves 42 and 44 are thus voids in the spaces between the ribs 50 and 52. Each of the grooves 42 and 44 therefore has a bottom wall that is defined by the radially outwardly facing surface of its respective central hub, a rear wall and a front wall that are defined by the opposing upstream-facing and downstream-facing surfaces of the triangular ribs 50 and 52 adjacent the groove, and a sidewall defined by the laterally inwardly-facing surface of the groove's respective wheel-half 36 and 38.

Referring to FIG. 4, the axially inwardly-facing surface of each central hub (the central hubs are not within view) of the wheel-halves 36 and 38 abut one another at a vertical plane. The axially inwardly-facing surfaces of the triangular ribs 50 and 52 are spaced from one another to form a channel 54. The channel 54 is bisected by the vertical plane where the central hubs abut (only the central hub 48 of the rear wheel-half 38 is shown). The laterally inwardly-facing surfaces of the opposing central hubs are therefore in direct, continuous contact with one another, and there are narrow gaps intermediate the laterally inwardly-facing surfaces of the triangular ribs 50 and 52 of the opposing wheel-halves 36 and 38 that form the radially-elongated annular channel 54 between the wheel-halves 36 and 38. Together, the laterally-abutting central hubs of the wheel-halves 36 and 38 define the radially-inward extreme from which the annular channel 54, as shown in FIG. 4, radially extends.

The radial grooves 42 of the front wheel-half 36 are aligned with the radial grooves 44 of the rear wheel-half 38 to form a series of generally rectangular carrier slots 56 that are axially bisected by the annular channel 54, as best shown in FIG. 4. The width and breadth of each of the carrier slots 56 is only large enough to accommodate a largest anticipated poultry mid-wing with little or no clearance between the walls of each slot and the outer surface of the inserted mid-wing. A mid-wing can thus be securely held in a carrier slot in a desired orientation by the walls defining the slot. There are preferably a total of 30 carrier slots 56 formed in the carrier wheel 22, although it is contemplated that the number of carrier slots 56 can be varied to accommodate the characteristics of a particular carrier wheel, such as the diameter of the carrier wheel and the rotational speed with which the carrier wheel turns, or the size of the mid-wings to be inserted therein. Generally, there should be an inverse relationship between the total number of carrier slots and the wheel's rotational speed for allowing convenient operation of the apparatus as will become apparent below.

In order to maintain proper alignment between the two wheel-halves 36 and 38, a cylindrical recess 60 (see FIG. 3) is formed in the central hub 48 of the rear wheel-half 38 and a corresponding cylindrical peg (not shown) extends axially from the central hub of the front wheel-half 36. The recess 60 and the cylindrical peg have substantially similar dimensions and are located at substantially the same radial position on their respective central hubs. The cylindrical peg fits snugly in the recess 60 when the central hubs abut one another, thereby, along with the driveshaft 40, preventing the two wheel-halves 36 and 38 of the carrier wheel 22 from rotating relative to one another while allowing the front wheel-half 36 to be axially separated from the rear wheel-half 38 in a convenient manner for maintenance or repair of the apparatus 10. Although the cylindrical peg and the recess 60 of the preferred embodiment of the apparatus 10 are cylindrical in shape, it is contemplated that the cylindrical peg and the recess 60 may be of any suitable shape, such as square, rectangular, triangular, or oblong. It is further contemplated that alternative embodiments of the apparatus 10 can incorporate more than one peg-recess pair, or that the locations of the cylindrical peg and the recess 60 can be reversed, with the cylindrical peg extending from the rear wheel-half 38 and the recess 60 formed in the front wheel-half 36.

Referring back to FIG. 2, the drive system 16 is mounted to the support frame 12 adjacent the rear of the carrier wheel 22. The drive system 16 of the preferred embodiment incorporates a conventional variable-speed drive (VSD) 64 that is coupled to the drive shaft 40 for rotatably driving the carrier wheel 22 in a clockwise rotational direction (as viewed in FIG. 3). A VSD is preferred for its ability to provide precisely controlled low-speed rotation of the carrier wheel 22, although it is contemplated that any other type of conventional drive system can alternatively be used. For example, it is contemplated that the drive system 16 can alternatively incorporate a conventional electric motor in combination with a series of drive sprockets and drive chains and/or gears. Regardless of the type of drive system used, the operational rotational speed of the carrier wheel 22 should preferably not exceed about 3 revolutions per minute (RPM) for the preferred carrier wheel 22, and more preferably not exceed about 2 RPM, for allowing an operator to comfortably feed mid-wings into the carrier slots 56 of the carrier wheel 22 in a manner that will be described in greater detail below. It is contemplated that the speed of rotation can be varied beyond the above-described ranges depending on factors such as the diameter of a particular carrier wheel and the number of carrier slots that are incorporated in a wheel. A control panel 66 is operatively connected to the drive system 16 and is conveniently positioned for allowing an operator to safely and easily control the operation of the apparatus 10.

Referring now to FIG. 3, the retention fender 32 is a sheet of food safe material, and preferably stainless steel, having a radially inwardly-facing arcuate surface with a contour that substantially matches the curvature of the periphery of the carrier wheel 22. The fender 32 has a lateral width that is slightly greater than the lateral width (axial length) of the carrier wheel 22, but at least as wide as the carrier slots 56. The retention fender 32 is rigidly mounted to the support frame 12 with its radially-inwardly facing surface in close radial proximity to the periphery of the wheel 22, preferably with a continuous separation of about ¼ inch between the two surfaces.

Still referring to FIG. 3, the splitting blade 30 is a substantially planar sheet of metal, and preferably stainless steel, having an inner cutting edge 68 and an outer cutting edge 70 that meet and terminate at an uppermost piercing tip 72. The splitting blade 30 is mounted to the support frame 12 substantially parallel to, and extends upwardly into, the annular channel 54 axially intermediate the opposing wheel-halves 36 and 38. The splitting blade 30 is positioned radially intermediate the retention fender 32 and the central hubs of the carrier wheel 22. The splitting blade 30 is preferably about ¼ inch thick at its thickest point, although splitting blades of other thicknesses are contemplated. It is generally required that the splitting blade 30 be thinner than the width of the annular channel 54 for allowing the splitting blade 30 to pass between the laterally opposing wheel-halves 36 and 38 without contacting, or substantially frictionally engaging, them.

As the inner and outer cutting edges 68 and 70 of the splitting blade 30 extend downwardly from the piercing tip 72, the profile of the blade 30 widens in a generally linear fashion for several inches. Extending further downward along the blade 30, the inner edge 68 of the blade 30 curves radially inwardly, toward the central hubs of the carrier wheel 22, until it reaches a lower terminus 74 that is in close radial proximity to the radially outwardly facing surface of the central hubs.

As the outer cutting edge 70 of the splitting blade 30 extends downwardly, below the lower terminus 74 of the inner edge 68, it curves radially outwardly for several inches, away from the hubs of the carrier wheel 22, until it reaches an apex near the outer periphery of the carrier wheel 22. The outer edge then curves radially outwardly at a much more gradual rate until reaching a lower terminus 76 immediately adjacent the outer periphery of the carrier wheel 22 and in close radial proximity to the inner surface of the retention fender 32.

It is preferred that the portions of the splitting blade's inner and outer cutting edges 68 and 70 that are immediately adjacent each edge's lower terminus be sharper than the other portions of the edges 68 and 70. Specifically, the portions of the inner and outer cutting edges 68 and 70 that are immediately adjacent the edges' lower termini 74 and 76 should be sharp enough to sever the connective tissue of a typical poultry mid-wing, but not sharp enough to damage the radius and ulna bones of a mid-wing upon moderately forceful contact as provided by the rotational motion of the carrier wheel 22. The other portions of the inner and outer cutting edges 68 and 70 of the splitting blade 30 (i.e., the portions not immediately adjacent the lower termini 74 and 76) are preferably only sharp enough to sever the softer, less resilient skin and muscle of a typical mid-wing, and are not sharp enough to sever the firmer, more resilient connective tissue of a mid-wing upon moderately forceful contact as provided by the rotational motion of the carrier wheel 22. These less sharp portions of the blade 30 are less likely to nick the bones of the mid-wing than the sharper portions.

The description and depiction of the basic contours of the splitting blade 30 contained herein, while provided by way of example only, have been found to be particularly effective. It is contemplated, however, that numerous variations to the shape, position, and orientation of the splitting blade 30 can be incorporated without departing from the spirit of the invention as will be understood by one skilled in the art. For example, it is contemplated that the splitting blade can alternatively be triangular, circular or have a variety of other shapes. It is further contemplated that a rotatably driven splitting blade, such as the blade of a circular saw, can be incorporated into an alternative embodiment of the apparatus 10.

Still referring to FIG. 3, the ejector comb 34 is a substantially planar piece of sheet metal having a bracket segment 78 with a plurality of elongated, parallel tines 80 extending therefrom. It is preferred that the ejector comb 34 be formed of stainless steel, although it is contemplated that the comb 34 can be formed of any sufficiently rigid, food safe material, including, but not limited to Delrin or comparable thermoplastics conventionally used in food processing applications.

Like the splitting blade 30, the ejector comb 34 is removably mounted to the support frame 12 substantially parallel to, and extends upwardly into, the annular channel 54 axially intermediate the carrier slots 56 of the carrier wheel 22. The ejector comb 34 is positioned downstream from the splitting blade 30 with the tines 80 of the comb 34 extending downstream at a downward angle from adjacent the central hubs to the outer periphery of the carrier wheel 22.

The ejector comb 34 is preferably about ¼ inch thick, although combs of other thicknesses are contemplated. It is a general requirement that the ejector comb 34 be thinner than the width of the annular channel 54 for allowing the comb 34 to pass between the laterally-opposing wheel-halves 36 and 38 without substantially impeding the rotation of the carrier wheel 22.

It is contemplated the ejector comb 34 can have a variety of alternative shapes and sizes to those described above and shown herein. For example, it is contemplated that the ejector comb 34 can incorporate a greater or lesser number of tines 80 than the four tines shown in FIG. 3. It is further contemplated that the tines 80 of the comb can be curved radially inwardly, toward the central hubs of the carrier wheel 22, or radially outwardly, away from the central hubs of the carrier wheel 22. It is important, however, that the lower terminus of at least one of the tines 80 be positioned substantially adjacent the periphery of the carrier wheel 22.

Referring back to FIG. 1, the collection bin 18 is preferably a conventional rectangular bin having an open top that is removably mounted to the supporting frame 12 below the splitting station 14 for catching product that is ejected from the carrier wheel 22, as will be described in greater detail below. The bin 18 preferably includes a lip 82 that extends outwardly from the periphery of its top edge for resting upon, and slidably engaging, a pair of L-shaped support brackets 84 that extend laterally from the front of the support frame 12 for supporting the bin 18 in an upright orientation. It is contemplated that the support brackets 84 can alternatively be omitted and that the bottom of the collection bin 18 can be alternatively seated on a shelf or other support structure on the frame for holding the bin 18 in position below the splitting station 14. The bin 18 preferably has a plurality of apertures formed in its bottom surface for allowing water and other fluids to drain from the bin 18, although it is contemplated that the apertures may be omitted.

Figure 5:
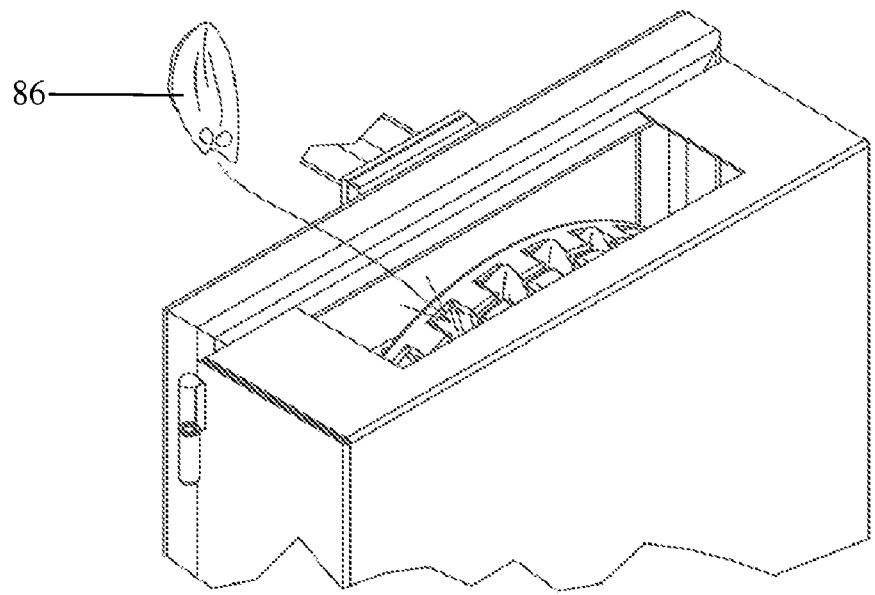
FIG. 5 is a partial perspective view illustrating a poultry mid-wing being inserted into a carrier slot of the present invention shown in FIG. 1.

During typical operation of the apparatus 10, a human operator sequentially inserts whole poultry mid-wings, such as the mid-wing 86, into empty carrier slots at the top of the carrier wheel 22 as the wheel 22 rotates in a clockwise direction, as shown in FIGS. 5 and 6. The mid-wings are inserted into the carrier slots longitudinally, with the radius portion of the mid-wings positioned substantially in one lateral half of the slot and the ulna portion of the mid-wing positioned substantially in the opposing lateral half of the slot. The mid-wings are preferably inserted into the carrier slots with the smaller wing-tip end of each mid-wing positioned radially inward of the larger drumette end. This orientation is preferred because it facilitates more reliable ejection of the mid-wings from the carrier slots 56 as will be described in greater detail below.

Referring now to FIGS. 6-11, the slotted mid-wing 86 is moved in the direction of the arrow by the carrier wheel 22 from the insertion point in a downstream direction toward the splitting blade 30. When the mid-wing 86 reaches the splitting blade 30 (as shown in FIG. 7), the piercing tip 72 of the splitting blade 30 pierces the mid-wing 86 at a point laterally intermediate the radius and ulna bones of the mid-wing. As previously described, it is preferred that the piercing tip 72 be sharp enough to pierce the skin and the muscle of a mid-wing, but not sharp enough to damage the bones of a mid-wing, given the amount of force provided by the carrier wheel 22, even if the tip 72 contacts a bone. Thus, if the mid-wing 86 is slightly misaligned within the carrier slot resulting in the piercing tip 72 striking one of the radius or ulna bones of the mid-wing, the tip 72 will not pierce or nick the bone, but will instead force the bone to shift or slide laterally to the outer side of the splitting blade 30 and thus allow the blade 30 to pass between the radius and ulna bones.

As the mid-wing 86 is forced further downstream and onto the splitting blade 30 as shown in FIG. 8, the inner and outer cutting edges 68 and 70 of the blade 30 sever the soft tissue of the mid-wing 86 longitudinally outwardly from the point of entry of the piercing tip 72 toward the opposing wingtip and drumette ends of the mid-wing 86. After the mid-wing 86 is forced downwardly over the first several inches of the splitting blade 30, the connective tissue at the crux of the wingtip end of the mid-wing 86 engages the inwardly-curving portion of the inner edge 68 of the blade 30. It is important to note that if the inner edge 68 strikes one of the radius or ulna bones, the relative dullness of the upper portion of the inner edge 68 (described above) allows the inner edge 68 to slide along the surface of the bone and effectively "seek" the connective tissue at the wingtip end without nicking or cutting the bone.

After engaging the relatively dull portion of the inner edge 68 of the splitting blade 30, the crux of connective tissue at the wingtip end of the mid-wing 86 (which is too firm to be cut cleanly by the dull portion of the inner edge 86) slides downwardly and radially inwardly along the inner edge 68, toward the central hubs of the carrier wheel 22. When the wingtip end of the mid-wing 86 approaches the lower terminus 74 of the inner edge 68 of the splitting blade 30, the connective tissue at the wingtip end is forced into a radial pinch point between the curving inner edge 68 of the blade 30 and the radially outwardly-facing surface of the central hubs (as shown in FIG. 8). The carrier wheel 22 then forces the mid-wing 86 downwardly, onto the relatively sharp portion of the inner edge 68 of the splitting blade 30 adjacent the inner edge's lower terminus 74, which thereby severs the connective tissue, skin, and muscle that connect the radius and ulna portions at the wingtip end of the mid-wing 86.

As the mid-wing 86 continues to be moved further downstream over the splitting blade 30, the connective tissue at the crux of the drumette end of the mid-wing 86 engages the curving outer edge 70 of the splitting blade 30. Because the radius and ulna portions have been completely severed from one another at the wingtip end of the mid-wing 86, the mid-wing 86 is free to be moved radially outwardly, along the curving outer edge 70 of the splitting blade 30 without interference from the inner edge 68 (as shown in FIG. 9). As with the inner edge 68, the relative dullness of the upper portion of the outer edge 70 of the splitting blade 30 allows the outer edge 70 to slide along the surfaces of the radius and ulna bones and seek the connective tissue at the drumette end without nicking or cutting the bones.

Figure 10:
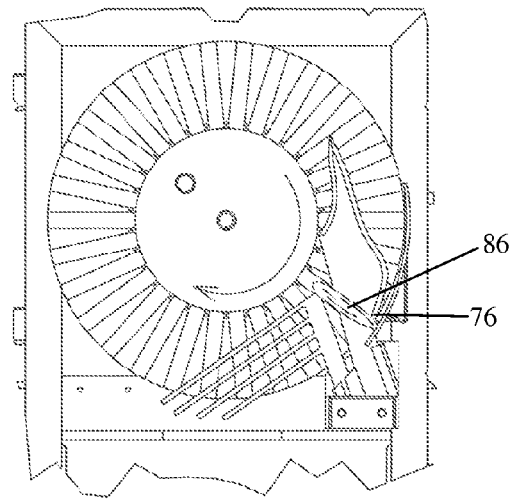

Also like the inner edge 68 of the splitting blade 30 described above, the curved outer edge 70 of the splitting blade 30 forces the crux of connective tissue at the drumette end of the mid-wing 86 to move outwardly and into a radial pinch point between the outer edge 70 and the inwardly-facing surface of the retention fender 32 (as shown in FIG. 9). The carrier wheel 22 then forces the mid-wing 86 downwardly, onto the relatively sharp portion of the outer edge 70 of the splitting blade 30 adjacent the outer edge's lower terminus 76, which thereby severs the connective tissue, skin, and muscle that connect the radius and ulna portions at the drumette end of the mid-wing 86 (as shown in FIG. 10).

Figure 11:
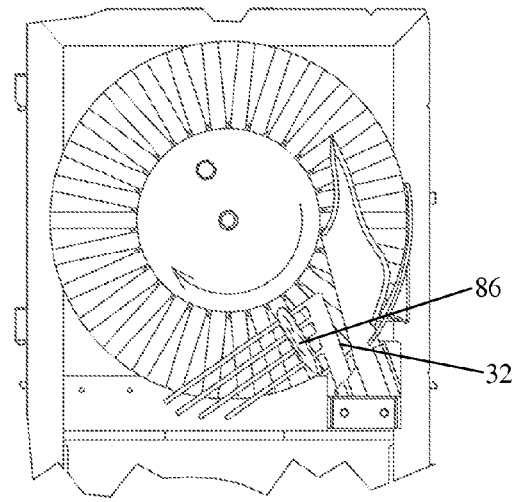
Figure 12:
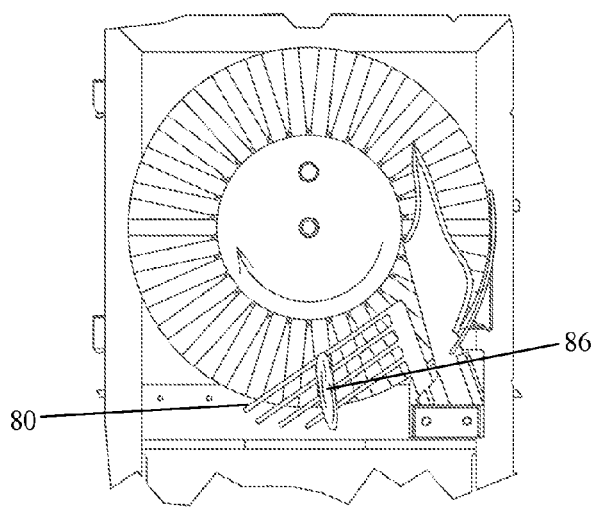
Figure 13:
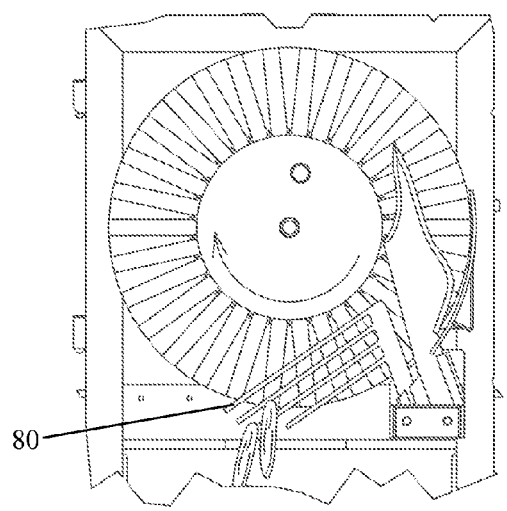

After the radius and ulna portions of the mid-wing 86 have been completely severed from one another and have been advanced downstream beyond the splitting blade 30, the radius and ulna portions are brought in engagement with the ejector comb 32 (as shown in FIG. 11). More particularly, the axially inwardly-facing surfaces of the separated radius and ulna portions of the mid-wing 86 are forced into engagement with the axially outwardly-facing surfaces of the ejector comb 32, thus causing the machined edges of the tines 80 to dig, or "bite", into the inwardly-facing surfaces the muscle, connective tissue, and, to a lesser extent, the skin of the radius and ulna portions. The engagement between the tines 80 and the radius and ulna portions, in cooperation with the radially inward-to-outward angling of the tines 80 across the carrier slots 56, causes the rotational force of the carrier wheel 22 on the mid-wing 86 to be translated into a generally radially outward force on the mid-wing 86. The force provided by the tines 80 thereby pushes the separated radius and ulna portions of the mid-wing 86 out of the carrier slot 56 (as shown in FIGS. 12 and 13), ejecting them into the collection bin 18 below.

As briefly described above, the orientation of the mid-wing 86 within the carrier slot 56 (i.e., with the drumette end of the mid-wing 86 nearer the periphery of the carrier wheel 22) generally allows the mid-wing 86 to be ejected more easily than if the orientation were reversed (i.e., with the wingtip end of the mid-wing 86 nearer the periphery of the carrier wheel 22). This is because the drumette end, which is larger and therefore more prone to snugly engage the inner walls of the carrier slot 56 than the smaller wingtip end, must travel a shorter distance to exit the slot 56 than the wingtip end. The described orientation therefore minimizes the overall amount of frictional engagement between the drumette end and the walls of the carrier slot 56 that must be overcome to eject the mid-wing 86 from the slot.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for splitting whole poultry mid-wings into separate radius and ulna portions comprising, in combination:
   a) a rotatably mounted carrier wheel having at least one radially oriented product carrier slot formed therein for receiving a poultry mid-wing for movement along an arcuate path of travel, the carrier wheel also having an annular channel formed therein that intersects said at least one product carrier slot; and
   b) a splitting blade disposed within the annular channel and in the path of travel to engage the mid-wing and separate the radius and ulna portions of the mid-wing from one another.

2. The apparatus in accordance with claim 1, wherein said at least one product carrier slot has a bottom wall and boundary walls extending from the bottom wall configured to inhibit upstream movement of the mid-wing.

3. The apparatus in accordance with claim 1, further comprising a retention fender having an arcuate surface spaced a selected distance from an outer surface of the carrier wheel to engage the mid-wing and urge and hold the mid-wing in said at least one product carrier slot.

4. The apparatus in accordance with claim 1, further comprising an ejector comb disposed within said annular channel and in the path of travel downstream of the splitting blade having at least one tine extending in a downstream and radially outward direction for engaging the separated radius and ulna portions and forcing them out of said at least one carrier slot.

5. The apparatus in accordance with claim 4, wherein said at least one tine comprises a plurality of tines in a parallel orientation relative to one another.

6. The apparatus in accordance with claim 1, wherein the splitting blade has an inner cutting edge and an outer cutting edge that terminate at a piercing tip that is located furthest upstream relative to the rest of the splitting blade, and wherein a radial distance between the inner cutting edge and the outer cutting edge increases as the edges extend downstream from the piercing tip.

7. The apparatus in accordance with claim 1, wherein the carrier wheel is formed of two substantially identical, laterally-opposing wheel-halves that are axially separable from another.

8. The apparatus in accordance with claim 1, wherein said at least one radially oriented product carrier slot comprises a plurality of radially oriented carrier slots that are spaced evenly about a circumference of the carrier wheel.

9. An apparatus for splitting poultry mid-wings into separate radius and ulna portions comprising, in combination:
   a) a rotatably mounted carrier wheel having at least one radially oriented product carrier slot formed therein for receiving a poultry mid-wing for movement along an arcuate path of travel, the carrier wheel also having an annular channel formed therein that intersects said at least one product carrier slot;
   b) a splitting blade disposed within the annular channel and in the path of travel to engage the mid-wing and separate the radius and ulna portions of the mid-wing from one another;
   c) a retention fender having an arcuate surface spaced a selected distance from an outer surface of the carrier wheel to engage the mid-wing and urge and hold the mid-wing in said at least one product carrier slot; and
   d) an ejector comb disposed within said annular channel and in the path of travel downstream of the splitting blade to engage the separated radius and ulna portions and force them out of said at least one carrier slot;
   wherein said at least one product carrier slot has a bottom wall and boundary walls extending from the bottom wall configured to inhibit upstream movement of the mid-wing.

* * * * *